United States Patent
Fujita

(10) Patent No.: US 8,315,437 B2
(45) Date of Patent: Nov. 20, 2012

(54) IMAGE PROCESSOR, CONTROL METHOD THEREFOR, IMAGE FORMING APPARATUS, AND PROGRAM

(75) Inventor: Sadao Fujita, Tokyo (JP)

(73) Assignee: Canon Kabushiki Kaisha (JP)

( * ) Notice: Subject to any disclaimer, the term of this patent is extended or adjusted under 35 U.S.C. 154(b) by 1378 days.

(21) Appl. No.: 11/954,096

(22) Filed: Dec. 11, 2007

(65) Prior Publication Data

US 2008/0137965 A1   Jun. 12, 2008

(30) Foreign Application Priority Data

Dec. 11, 2006   (JP) .................................. 2006-333750

(51) Int. Cl.
*G06K 9/00* (2006.01)
*G06K 9/40* (2006.01)
*G06K 15/00* (2006.01)

(52) U.S. Cl. ....... 382/112; 382/167; 382/274; 358/3.03; 358/3.26; 358/518

(58) Field of Classification Search .................. 382/112, 382/167, 274, 275, 282; 358/3.03, 3.26, 358/3.27, 518

See application file for complete search history.

(56) References Cited

U.S. PATENT DOCUMENTS

| | | | | |
|---|---|---|---|---|
| 4,910,598 | A * | 3/1990 | Itakura et al. | 348/247 |
| 7,697,151 | B2 * | 4/2010 | Mongeon | 358/1.14 |
| 2004/0114162 | A1 * | 6/2004 | McElvain | 358/1.9 |
| 2005/0030563 | A1 * | 2/2005 | Matsunami et al. | 358/1.9 |
| 2008/0054555 | A1 * | 3/2008 | Atsumi et al. | 271/275 |
| 2008/0137965 | A1 * | 6/2008 | Fujita | 382/209 |
| 2010/0118343 | A1 * | 5/2010 | Migishima | 358/1.15 |

FOREIGN PATENT DOCUMENTS

| | | |
|---|---|---|
| JP | 56-105579 A | 8/1981 |
| JP | 05-022593 A | 1/1993 |
| JP | 06-062240 A | 3/1994 |

* cited by examiner

*Primary Examiner* — Aaron W Carter
(74) *Attorney, Agent, or Firm* — Rossi, Kimms & McDowell LLP

(57) ABSTRACT

An image processor capable of detecting whether an image formed on a recording medium by the image forming apparatus is defective or non-defective with as high accuracy as possible and at high speed. A sheet-surface portion-determining section determines sheet-surface portions of a non-defective formed image on a pixel basis, and stores data of the sheet-surface portion/non-sheet-surface portion distribution, and extracts smallest RGB pixel values from image data of a group of pixels determined to correspond to a sheet-surface portion, to form RGB offset signals based on the smallest values. A sheet-surface portion determination-based offset section subtracts the values of the offset signals from the image data (RGB) of an inspection object. An image quality-determining section determines whether a formed image on the object is defective or non-defective on a pixel basis, using the most significant 1-bit RGB values subjected to the subtraction and the distribution data.

10 Claims, 12 Drawing Sheets

FIG. 4

IMAGE SIGNALS OF INSPECTION OBJECT (FROM MAIN MTF CORRECTOR)

R: 220 = |1|1|0|1|1|1|0|0|
G: 220 = |1|1|0|1|1|1|0|0|
B: 225 = |1|1|1|0|0|0|0|1|

−

OFFSET SIGNALS (FROM SHEET-SURFACE PORTION DISTRIBUTION-DETERMINING SECTION)

88 = |0|1|0|1|1|0|0|0|
90 = |0|1|0|1|1|0|1|0|
93 = |0|1|0|1|1|1|0|1|

=

SELECTION OF EACH MOST SIGNIFICANT BIT (TO IMAGE QUALITY-DETERMINING SECTION)

132 = |1|0|0|0|0|1|0|0|
130 = |1|0|0|0|0|0|1|0|
132 = |1|0|0|0|0|1|0|0|

NON-DEFECTIVE IMAGE DATA
(1: SHEET-SURFACE PORTION,
0: NON-SHEET-SURFACE PORTION)

SHEET-SURFACE PORTION/NON-SHEET-SURFACE PORTION DISTRIBUTION DATA

| ADDRESS: | 0 | 1 | 2 | 3 | ... | k | k+1 | k+2 | k+3 | ... | N-2 | N-1 | N |
|---|---|---|---|---|---|---|---|---|---|---|---|---|---|
| VALUE: | 1 | 1 | 1 | 1 | ... | 1 | 1 | 0 | 0 | ... | 1 | 1 | 1 |

PIXEL DATA GROUP WHICH ARE DETERMINED TO CORRESPOND TO SHEET-SURFACE PORTION

| R | G | B |
|---|---|---|
| 230 | 232 | 237 |
| 236 | 235 | 241 |
| 230 | 233 | 237 |
| 230 | 234 | 239 |
| 233 | 235 | 239 |
| 232 | 233 | 230 |
| 234 | 235 | 241 |
| 236 | 239 | 242 |
| 233 | 236 | 241 |
| 230 | 233 | 238 |
| 224 | 238 | 233 |
| 227 | 237 | 233 |
| 226 | 239 | 234 |
| 222 | 226 | 231 |
| 223 | 223 | 230 |
| 224 | 226 | 231 |
| 224 | 224 | 231 |
| 224 | 225 | 230 |
| 216 | 218 | 221 |
| 221 | 223 | 228 |
| 225 | 226 | 233 |
| ⋮ | ⋮ | ⋮ |

SMALLEST PIXEL VALUES

| 216 | 218 | 221 |
|---|---|---|
| R-min | G-min | B-min |

I

50%-LUMINANCE PIXEL VALUES (255 GRADATION)

| 128 | 128 | 128 |
|---|---|---|
| R-half | G-half | B-half |

II

OFFSET SIGNALS

| 88 | 90 | 93 |
|---|---|---|
| R-offset | G-offset | B-offset |

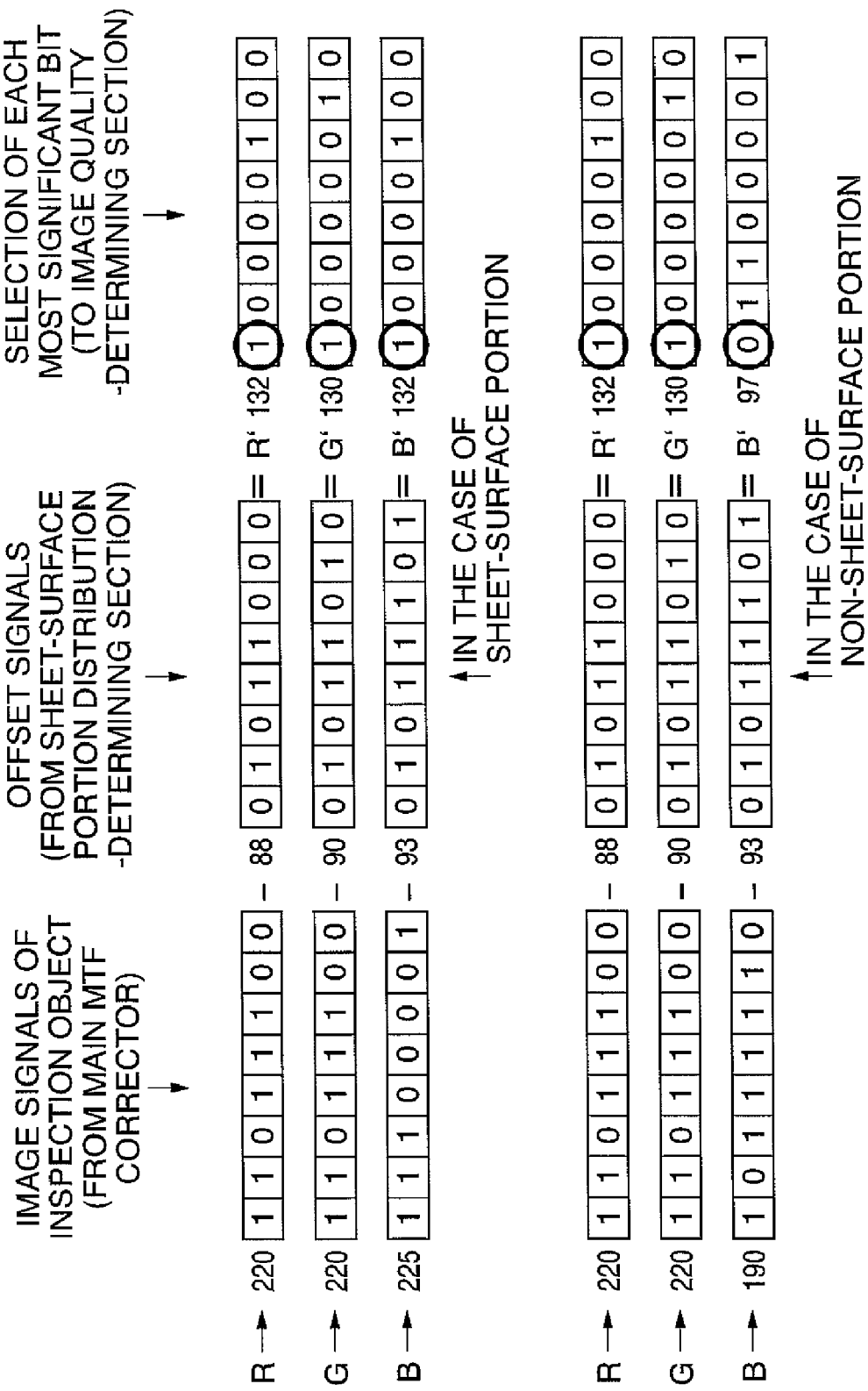

FIG. 8

SHEET-SURFACE PORTION
/NON-SHEET-SURFACE PORTION DISTRIBUTION DATA

0 →  UNNECESSARY TO PERFORM DETERMINATION
(FOR PIXEL SET IN NON-DEFECTIVE IMAGE: NON-SHEET-SURFACE PORTION)

1 →
(FOR PIXEL SET IN NON-DEFECTIVE IMAGE: SHEET-SURFACE PORTION)

| R' | G' | B' | DETERMINATION |
|---|---|---|---|
| 1 | 1 | 1 | NON-DEFECTIVE |
| 0 | 0 | 0 | DEFECTIVE |
| 0 | 0 | 1 | DEFECTIVE |
| 0 | 1 | 0 | DEFECTIVE |
| 0 | 1 | 1 | DEFECTIVE |
| 1 | 0 | 0 | DEFECTIVE |
| 1 | 0 | 1 | DEFECTIVE |
| 1 | 1 | 0 | DEFECTIVE |

IMAGE PROCESSOR, CONTROL METHOD THEREFOR, IMAGE FORMING APPARATUS, AND PROGRAM

BACKGROUND OF THE INVENTION

1. Field of the Invention

The present invention relates to a technique of determining whether an image on an output (recording medium) delivered from an image forming apparatus is non-defective or not.

2. Description of the Related Art

In recent years, with an increase in the range of use of image forming apparatuses, such as copying machines, the reliability of images formed thereby on the recording media, such as sheets, has come to be considered increasingly important. For example, a plurality of images based on the same image of an original (original image) have come to be more often recorded (formed) on a plurality of recording media, not only for internal use thereof within a company, but also for external use thereof outside the company. In such a case, it is regarded essential that all the images formed on the recording media are accurate copies of the original image.

An inaccurate copy of the original image is, for example, a defective image formed such that it bears a toner at a location which should be a surface of a recording medium.

To overcome such a problem, an inspection technique becomes necessary which detects recording media having such defective images formed thereon. Further, in the inspection, from the viewpoint of productivity, it is required to detect defective images at high speed.

It should be noted that Japanese Laid-Open Patent Publication (Kokai) No. H05-022593 discloses a technique of quickly discriminating a read image from a particular image, such as the image of a currency note. In this technique, higher five bits of an 8-bit signal indicative of a pixel value of each of RGB colors read in by a CCD are used to perform the discrimination.

According to the technique disclosed in Japanese Laid-Open Patent Publication (Kokai) No. H05-022593, as a signal for use in discriminating a read image from a particular image, such as the image of a currency note, there is employed a signal formed by dropping the lower bits of the 8-bit signal, as mentioned above. Therefore, according to the disclosed technique, by dropping the lower bits, details of information on the read image are lost. This can undesirably cause an overlook of a very small defect during inspection of the recording media.

From the view point of inspection accuracy, it is desirable to perform inspection using all bits of the signal indicative of a pixel value of each of RGB colors. In this case, however, the speed of inspection becomes lower.

SUMMARY OF THE INVENTION

The present invention makes it possible to detect whether an image formed on a recording medium by an image forming apparatus is defective or non-defective with as high accuracy as possible and at high speed.

In a first aspect of the present invention, there is provided an image processor that determines whether images formed on a plurality of recording media based on an image on an original are defective or non-defective, comprising a first determination unit configured to determine an area of a sheet-surface portion in a first image formed on a predetermined recording medium, based on the image of the original, a correction unit configured to perform correction on image data of a second image formed on another recording medium based on the image of the original, by making use of image data of a group of pixels which are determined to correspond to the area of the sheet-surface portion, by the first determination unit, and a second determination unit configured to determine whether or not the second image is defective or non-defective by making use of a value of a predetermined one bit of image data of the second image corrected by the correction unit.

With the configuration according to the first aspect of the present invention, image data of the second image is corrected by making use of image data of a group of pixels which are determined to correspond to a sheet-surface portion in the first image. Further, the value of the predetermined one bit of each pixel value of image data of the corrected second image is used to determine whether the second image is defective or non-defective.

Therefore, according to the first aspect of the present invention, it is possible to detect whether an image formed on the recording medium by the image forming apparatus is defective or non-defective with as high accuracy as possible and at high speed.

The first determination unit can include a calculation unit configured to calculate an offset value by making use of a smallest pixel value of image data of the group of pixels which are determined to correspond to the area of the sheet-surface portion.

The calculation unit can calculate the offset value by subtracting a predetermined luminance value from the smallest pixel value.

The correction unit can include a subtraction unit configured to subtract the offset value from each pixel value of the image data of the second image.

The second determination unit can determine whether the second image is defective or non-defective, using a value of the most significant bit of image data in the area of the sheet-surface portion out of the image data of the second image as a result of the subtraction by the subtraction unit.

The first image and the second image can be color images, and the first determination unit, the correction unit, the second correction unit, the calculation unit, and the subtraction unit can perform processing on three primary-color components of the image data which form a color image.

The image processor can comprise a discharge destination-switching unit configured to switch a destination of the recording medium having the second image formed thereon according to the result of the determination of the second image by the second determination unit as to whether the second image is defective or non-defective.

In a second aspect of the present invention, there is provided claim a method of controlling an image processor that determines whether images formed on a plurality of recording media based on an image on an original are defective or non-defective, comprising a first determination step of determining an area of a sheet-surface portion in a first image formed on a predetermined recording medium, based on the image of the original, a correction step of performing correction on image data of a second image formed on another recording medium based on the image of the original, by making use of image data of a group of pixels which are determined to correspond to the area of the sheet-surface portion, in the first determination step, and a second determination step of determining whether or not the second image is defective or non-defective by making use of a value of a predetermined one bit of image data of the second image corrected in the correction step.

In a third aspect of the present invention, there is provided an image forming apparatus in which an image processor that determines whether images formed on a plurality of recording media based on an image on an original are defective or non-defective, wherein the image processor comprises a first determination unit configured to determine an area of a sheet-surface portion in a first image formed on a predetermined recording medium, based on the image of the original, a correction unit configured to perform correction on image data of a second image formed on another recording medium based on the image of the original, by making use of image data of a group of pixels which are determined to correspond to the area of the sheet-surface portion, by the first determination unit, and a second determination unit configured to determine whether or not the second image is defective or non-defective by making use of a value of a predetermined one bit of image data of the second image corrected by the correction unit.

In a fourth aspect of the present invention, there is provided an computer-readable control program for causing a computer to execute a method of controlling an image processor that determines whether images formed on a plurality of recording media based on an image on an original are defective or non-defective, wherein the control program comprises a first determination module for determining an area of a sheet-surface portion in a first image formed on a predetermined recording medium, based on the image of the original, a correction unit module for performing correction on image data of a second image formed on another recording medium based on the image of the original, by making use of image data of a group of pixels which are determined to correspond to the area of the sheet-surface portion, by the first determination module, and a second determination module for determining whether or not the second image is defective or non-defective by making use of a value of a predetermined one bit of image data of the second image corrected by the correction module.

The features and advantages of the invention will become more apparent from the following detailed description taken in conjunction with the accompanying drawings.

BRIEF DESCRIPTION OF THE DRAWINGS

FIG. 4 is a conceptual diagram useful in explaining a subtraction process executed by a sheet-surface portion determination-based offset section of the image processor.

FIG. 7 is a conceptual diagram useful in explaining the use of the offset signal.

FIG. 8 is a conceptual diagram useful in explaining a image quality-determining process executed by an image quality-determining section of the image processor.

DETAILED DESCRIPTION OF THE PREFERRED EMBODIMENTS

The present invention will now be described in detail with reference to the drawings showing preferred embodiments thereof.

Figure 1:
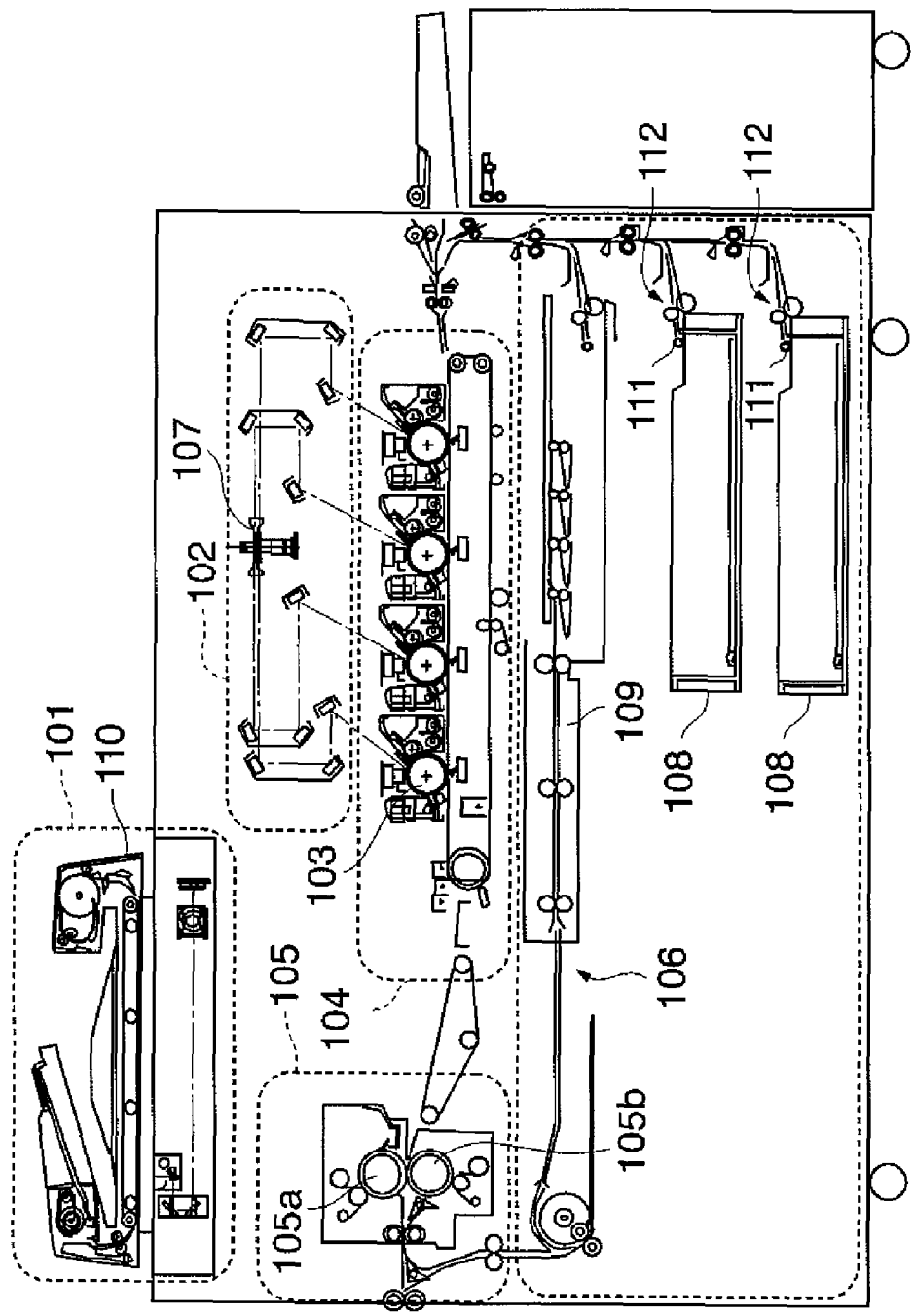
FIG. 1 is a schematic cross-sectional view of the hardware configuration of an image forming apparatus according to a first embodiment of the present invention.

FIG. 1 is a cross-sectional view useful in explaining the outline of the hardware configuration of an image forming apparatus according to a first embodiment of the present invention. The image forming apparatus is comprised of a scanner section 101, a laser exposure section 102, an image forming section 104 including photosensitive drums 103, a fixing section 105, and a conveying section 106.

The scanner section 101 is provided with an automatic document feeder (ADF) 110. The scanner section 101 irradiates light onto an original fed onto an original platen glass by the ADF 110. Reflected-light from the original becomes an image light reflecting an original image. The scanner section 101 reads the image light by a CCD 301 (see FIG. 3). The CCD 301 converts the image light into electric signals and outputs the electric signals as analog image signals.

Figure 3:
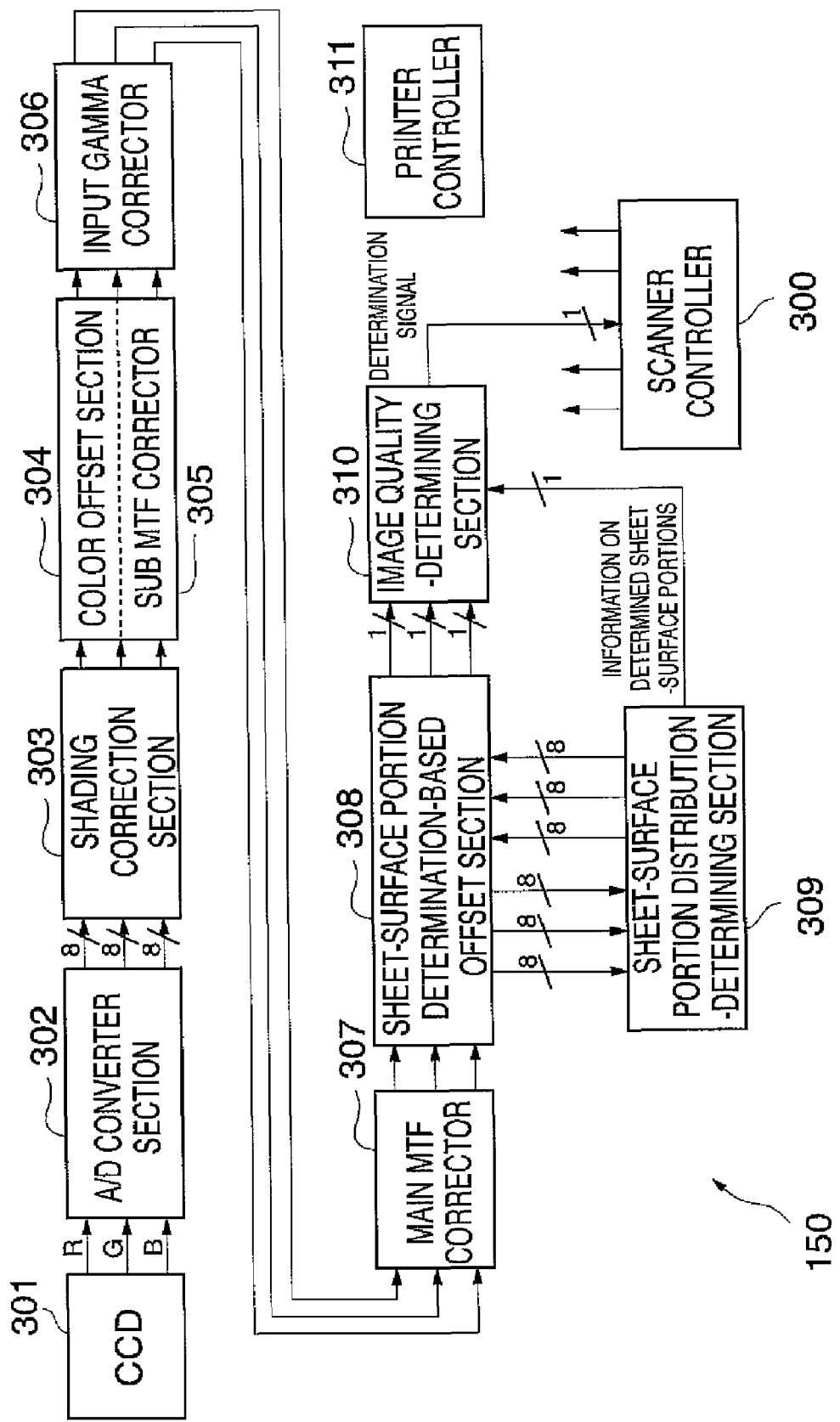
FIG. 3 is a block diagram of an image processor of a scanner section of the image forming apparatus.

The scanner section 101 includes an image processor 150 shown in FIG. 3. The image signals output from the CCD 301 are subjected to A/D conversion and various kinds of image processing by the image processor 150, followed by being output as digital image data to the laser exposure section 102.

The laser exposure section 102 irradiates each photosensitive drum 103 with an associated laser beam modulated based on the image data output from the scanner section 101. At this time, the laser exposure section 102 deflects the laser beam in a certain direction at a constant angular velocity by rotation of a polygon mirror 107 to irradiate the laser beam as a scanning light onto the photosensitive drum 103.

The image forming section 104 includes four image forming stations corresponding to respective colors of cyan (C), magenta (M), yellow (Y), and black (K). These four stations are configured to form images by an electrophotographic process. More specifically, each of the image forming stations includes the associated photosensitive drum 103, an electrostatic charger, not particularly indicated, a developing device, not particularly indicated, and a cleaning device, not particularly indicated.

The photosensitive drum 103 of each image forming station is charged in advance by the associated electrostatic charger for an image forming operation. When the modulated laser beam is irradiated onto the charged photosensitive drum 103, an electrostatic latent image associated with the image light is formed on the surface of the photosensitive drum 103. This electrostatic latent image is developed as a toner image by the associated developing device. The toner image is transferred onto a recording medium, such as a sheet of paper. Residual toner remaining on the photosensitive drum 103 after the transfer operation is removed by the associated cleaning device.

This image forming processing including the above-mentioned sequential operations is carried out at each of the stations for the respective colors arranged in order of C, M, Y, and K. It should be noted that timing for executing the image forming processing is different from station to station. More specifically, the image forming processing is started first in the cyan station, and then sequentially performed in the magenta, yellow, and black stations in the mentioned order. The timing for executing the image forming processing in each of the stations for the respective colors is controlled as mentioned above, whereby toner images in the respective colors can be accurately transferred onto the conveyed recording medium in superimposed relation. Thus, the toner images in the respective colors form a full-color image without color shifts on the recording medium.

The fixing section 105 has a heating roller 105a and a pressing roller 105b, and heats and presses the full-color toner image transferred on the recording medium to thereby fix the same thereon. When an image is to be formed only on a single side of the recording medium, the recording medium having undergone the fixing process is discharged from the apparatus by the conveying section 106. On the other hand, when images are to be formed on both sides of the recording medium, the recording medium having undergone the fixing process for one side of the recording medium is conveyed by the conveying section 106 through the image forming section 104 and the fixing section 105 again via a double-sided conveying path 109.

The conveying section 106 includes sheet cartridges 108 each containing sheet-type recording media in a stacked state. In the vicinity of each of the sheet cartridges 108, there are arranged a pickup roller 111 and a separation roller pair 112. The recording media in each of the sheet cartridges 108 are picked up one by one by the associated pickup roller 111. When a plurality of recording media are picked up simultaneously, the separation roller pair 112 separates only one recording medium from the other such that the recording media can be conveyed one by one. Thereafter, the recording medium is conveyed toward the image forming section 104.

It should be noted that the scanner section 101 including the ADF 110 and the image processor 150 is controlled by a scanner controller 300 appearing in FIG. 3. Further, the scanner controller 300 store programs for executing an inspection process, described hereinafter with reference to FIG. 9, and other processes.

The laser exposure section 102, the image forming section 104, the fixing section 105, the conveying section 106, and so forth, i.e. the sections forming a printer engine, are controlled by a printer controller 311 appearing in FIG. 3. Further, each of the scanner controller 300 and the printer controller 311 performs its own control operation under the control of a main controller (not shown) so that all the sections of the apparatus can carry out smooth image forming processing in harmony with each other.

Next, the ADF 110 will be described with reference to FIG. 2. An original for image reading is set on an original stacker 201 appearing in FIG. 2. The original set on the original stacker 201 is detected by an original detecting sensor (not shown). The original detecting sensor is disposed between a pickup roller 202 and a feed roller 203.

An original feeder 204 including the pickup roller 202 and the feed roller 203 also includes a registration roller pair 205. The pickup roller 202 picks up an uppermost sheet of a bundle of originals placed on the original stacker 201. The feed roller 203 conveys a picked-up original toward the registration roller pair 205.

In this case, originals are separated from the bundle one after another by a frictional separation method and are picked up one by one, and each picked-up original is conveyed toward the registration roller pair 205. More specifically, in the case of feeding originals, the pickup roller 202 is lowered onto the bundle of originals, and at the same time an intermediate plate (not shown) inserted into the bundle of originals is raised to press the bundle of originals against the feed roller 203. In this state, the feed roller 203 and the pickup roller 202 are rotated in a CW (clockwise) direction as viewed in FIG. 2, for conveying the original. At this time, if a second uppermost original and the following are moved together with an uppermost original (hereinafter referred to as "the top sheet"), friction pieces (not shown) stop the movement of the second uppermost original and the following, so that the originals are held on the original stacker 201. Thus, the top sheet is separated from the second and following originals. This separation of the top sheet is detected by a separation sensor (not shown) disposed downstream of the feed roller 203.

Then, the original is guided by a guide plate (not shown) to the registration roller pair 205. When the leading end of the original reaches the registration roller pair 205, the registration roller pair 205 is in a rotation stopped state. Therefore, the original is looped or upwardly curved by conveyance operation of the feed roller 203. In a process of returning from this looped state to a flat state, the original has its skew corrected. Then, as the registration roller pair 205 starts rotation, the original is conveyed to an original conveying section 206.

The original conveying section 206 has a conveyor belt 207. This conveyor belt 207 is stretched by a driving roller 208 and a driven roller 209. In the case of conveying an original, the conveyor belt 207 is pressed against a platen (original platen glass) by a presser roller 210.

The original brought in between the conveyor belt 207 and the platen is conveyed on the platen by a frictional force between the original and the conveyor belt 207. Then, when the original reaches a predetermined original reading position, the conveyance of the original is stopped. In this conveyance stopped state, an original image (image of the original) is read by the scanner section 101. After completion of the reading of the original image, the original is conveyed to an original inversion and discharge section 211 by the conveyor belt 207.

If there is a next original, the original is conveyed to the predetermined original reading position in the same manner as the preceding one is, and the conveyance of the original is stopped so as to read an original image. During this reading operation for reading the image from the following, the preceding original is inverted by the original inversion and discharge section 211 and is discharged into a non-defective original discharge section 212 or a defective original discharge section 213.

Next, a description will be given of an original inversion and discharge operation. The original inversion and discharge section 211 includes an inversion roller 215 and a conveying roller pair 214. The inversion roller 215 and the conveying roller pair 214 are driven by a different motor from a drive motor of the original conveying section 206. The motor for driving the inversion roller 215 and the conveying roller pair 214 is capable of performing both forward and reverse rotations.

Figure 2:
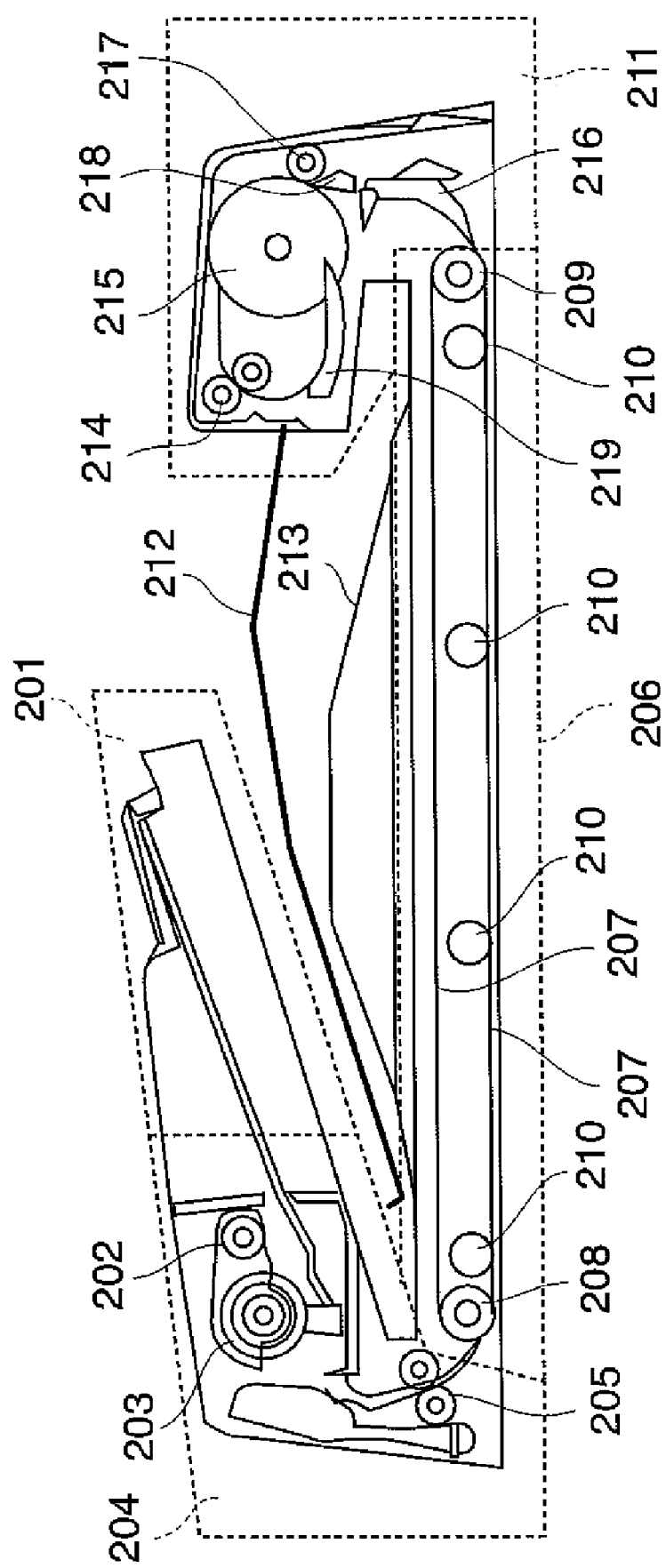
FIG. 2 is a schematic cross-sectional view of the hardware configuration of an ADF.

At a moment when an original enters the original inversion and discharge section 211, an inverting flapper 216 and a discharge flapper 218 are held in respective positions, shown in FIG. 2, by control of a solenoid (not shown). Therefore, the original is guided in between the inversion roller 215 and a reverse roller 217. The reverse roller 217 is pressed against the inversion roller 215 by a slight force. When the original is guided in between the inversion roller 215 and the reverse roller 217, the inversion roller 215 is rotated in a CCW (counterclockwise) direction as viewed in FIG. 2. As a consequence, the original is conveyed toward the conveying roller pair 214 in a state sandwiched between the inversion roller 215 and the reverse roller 217.

When the trailing end of the original passes through the discharge flapper 218, the discharge flapper 218 starts a CW rotation as viewed in FIG. 2, and the inversion roller 215 and the upper roller of the conveying roller pair 214 are reversely rotated in the CW direction as viewed in FIG. 2. It should be noted that when the trailing end of the original has passed through the discharge flapper 218, at least the leading end thereof has reached the conveying roller pair 214. Further, since the discharge flapper 218 performs CW rotation as viewed in FIG. 2, the reverse roller 217 moves away from the inversion roller 215. As a consequence, a space is formed between the reverse roller 217 and the inversion roller 215.

By rotating the inversion roller 215 and the upper roller, as viewed in FIG. 2, of the conveying roller pair 214 in the CW direction, as viewed in FIG. 2, in the above-mentioned state where the reverse roller 217 is held away from the inversion roller 215, it is possible to convey an original in a switch-back manner as described below. In this switch-back conveyance, the original passes below the inversion roller 215, as viewed in FIG. 2, and is usually discharged into the non-defective original discharge section 212. In this case, the original discharged into the non-defective original discharge section 212 is placed in a state inverted from the state on the original stacker 201.

It should be noted that a discharge destination-switching flapper 219 switches a discharge destination of an original according to the result of determination by the image processor 150 (see FIG. 3), described hereinafter, as to whether a formed image is defective or non-defective. In the present embodiment, the term "original" used here in this case means a recording medium (output) which is once discharged after having an image formed thereon by the image forming apparatus and is subjected to the inspection process, described hereinafter. Further, the "formed image" is a term used for distinction from the "original image" as an image on an original in its original sense, and is intended to mean an image formed on a recording medium, which is discharged after having undergone the above-described image forming processing.

When it is determined that a formed image is "non-defective", an original having the image formed thereon is discharged into the non-defective original discharge section 212. In this case, the discharge destination-switching flapper 219 is held in a state having the leading end (pointed portion as viewed in FIG. 2) thereof lowered, by control of the solenoid (not shown). On the other hand, when it is determined that a formed image is "defective", the discharge destination-switching flapper 219 is switched into a state shown in FIG. 2. As a consequence, the original with the defectively formed image is discharged into the defective original discharge section 213 by the switch-back conveyance. In this case as well, the original discharged into the defective original discharge section 213 is placed in the state inverted from the state on the original stacker 201.

Next, the image processor 150 will be described. FIG. 3 is a schematic block diagram of the image processor 150. The image processor 150 (except for the printer controller 311) is installed in the scanner section 101 or in the ADF 110. The image processor 150 is capable of determining whether formed images, corresponding to the same original image, which are formed on a plurality of recording media and are discharged through the image forming processing, are each defective or non-defective.

The outline of this determination can be described as follows: A user selects, from a plurality of recording media which have images corresponding to the same original image formed thereon and are discharged through the image forming processing, only one with a formed image thereon which the user has determined to be normal. Then, the selected recording medium is read as an original by the scanner section 101 of the image forming apparatus.

In the following description, a recording medium selected by the user as having a normally or non-defectively formed image thereon from a plurality of recording media which have images corresponding to the same original image formed thereon and are discharged through the image forming processing will be referred to as "the selected recording medium". Further, the other non-selected recording media with the same original image will be referred to as "the inspection object". In the present first embodiment, a variation of the present embodiment, described hereinafter, and a second embodiment, also described hereinafter, it is assumed that a selected recording medium and inspection objects (the other non-selected recording media) are of the same kind, and hence identical in brightness (luminance) due to properties of the material thereof and the like.

Next, whether pixels belong to a bare surface portion of the recording medium (hereinafter referred to as "the sheet-surface portion") in the normal formed image on the selected recording medium is determined for each set of three RGB pixels. It should be noted that a "sheet-surface portion" is an area on a formed image, which corresponds to an area of the original image, in which none of images, such as characters and figures, as information, are recorded thereon.

Then, information on a sheet-surface portion/non-sheet-surface portion distribution in the non-defective formed image is stored on a pixel set-by-pixel set basis based on the pixel set-specific determination as to the sheet-surface portion. As for the formed image on each inspection object, whether it is defective or non-defective is determined on a pixel-by-pixel basis, or more strictly, on a pixel set-by-pixel set basis, based on the sheet-surface portion/non-sheet-surface portion distribution in the non-defective formed image. Examples of defective images in this case include an image having toner adhering to an area to be formed originally as a sheet-surface portion. Then, if the number of pixels associated with a defective image exceeds a predetermined value, the inspection object is determined as defective.

In the following, the determination process in the first embodiment will be described in detail with reference to FIGS. 3 to 9.

It should be noted that a sheet-surface portion determination-based offset section 308, a sheet-surface portion distribution-determining section 309, and an image quality-determining section 310 each appearing in FIG. 3 are functional blocks specific to the present embodiment. The other functional blocks than these three are also provided in the conventional image forming apparatus. In other words, the component elements provided in the conventional image forming apparatus are effectively utilized to thereby realize the inspection process specific to the present embodiment at low costs. This applies to the variation of the first embodiment (see FIG. 11) and the second embodiment (see FIG. 2). In the second embodiment, however, an A/D conversion section 302 has its conventional function slightly expanded.

An optical image from the optical system of the scanner section 101 is converted into electric signals by the CCD sensor 301. The CCD sensor 301 is a color sensor comprised of three line sensors of R (red), G (green), and B (blue). Therefore, the CCD sensor 301 outputs three analog signals of the respective RGB colors as photoelectrically converted electric signals. These analog signals are delivered to the A/D conversion section 302. The A/D conversion section 302 performs gain adjustment and offset adjustment on the input analog image signals and then converts these into 8-bit digital image data on a color-by-color basis.

A shading correction section 303 performs shading correction on each of the B-bit digital image data associated with the respective RGB colors. In this shading correction, a read signal from a reference white plate is used. Color shifts are corrected by the shading correction. A color shift occurs e.g. due to variation in the sensitivity between pixels of the CCD sensor 301 or variation in the quality of light from an original illuminating lamp.

The line sensors of the CCD sensor 301 for the respective colors are arranged in a predetermined spaced relationship. This spaced relationship between the color line sensors of the CCD sensor 301 causes a spatial position displacement between the image data for the respective colors in the sub scanning direction (sheet feeding direction). This displacement is corrected by a line delay adjustment circuit (not shown) of a color offset section 304.

Further, shifts in spatial frequency between the image data for the respective colors in the sub scanning direction occur e.g. due to the spaced relationship between the color line sensors of the CCD sensor 301 and the sensitivity variation between the color line sensors. The shifts in spatial frequency are corrected by a sub MTF (Modulation Transfer Function) corrector 305. In this correction, degradation of contrast or image blur due to reduced space between white and black is corrected.

An input gamma (γ) corrector 306 is comprised of a one-dimensional look-up table (LUT). The input gamma corrector 306 refers to the look-up table and corrects input image data associated with the respective colors RGB colors such that exposure and luminance are held in linear relationship. A main MTF corrector 307 obtains a weighted average of a target pixel and left and right adjacent pixels to thereby achieve MTF correction in the main scanning direction.

When image data (8 bits for each of the RGB colors) associated with the non-defective formed image on the selected recording medium is output from the main MTF corrector 307, the sheet-surface portion determination-based offset section 308 transfers the image data to the sheet-surface portion distribution-determining section 309. Further, the sheet-surface portion determination-based offset section 308 receives offset signals (8 bits for each of the RGB colors), described hereinafter, from the sheet-surface portion distribution-determining section 309.

Furthermore, the sheet-surface portion determination-based offset section 308 subtracts the offset signal values from the image data of the formed image on the inspection object delivered from the main MTF corrector 307. This subtraction processing is performed on a pixel-by-pixel basis. Then, the sheet-surface portion determination-based offset section 308 delivers most significant bits (one bit for each of the RGB colors, i.e. a total of 3 bits for each set of three RGB color pixels) of the image data obtained from the subtraction to the image quality-determining section 310.

It should be noted that when the value of image data becomes "negative" by the above subtraction, all eight bits of the image data are set to 0. The value of image data becomes "negative" when there is a high possibility of a pixel being concerned with information on characters or the like. Therefore, when there is a high possibility of the pixel being concerned with information on characters or the like, a most significant bit value of 0 is sent to the image quality-determining section 310.

When image data (8-bit data for each of the RGB colors) for use in forming the non-defective image on the selected recording medium is sent from the main MTF corrector 307 via the sheet-surface portion determination-based offset section 308, the sheet-surface portion distribution-determining section 309 determines whether pixels correspond to a sheet-surface portion of the non-defective formed image on the selected recording medium, on a pixel set-by-pixel set basis. Then, the sheet-surface portion determination-based offset section 309 stores the information on the sheet-surface portion/non-sheet-surface portion distribution in the non-defective formed image, on a pixel set-by-pixel set basis, based on the result of the determination.

In the sheet-surface portion-determining process, the prior art technique can be used. That is, as disclosed in Japanese Laid-Open Patent Publication (Kokai) No. H06-62240 (Japanese Patent Registration No. 03255720), upper and lower limit reference pixel values Rmin, Rmax, Gmin, Gmax, Bmin, and Bmax for determination are stored in advance in the sheet-surface portion distribution-determining section 309. Then, as to image data of the RGB colors of the non-defective formed image, when the pixel values R, G, and B of the colors in the same area (i.e. three RGB pixel values corresponding to a set of associated pixel portions in the image) satisfy the conditions of Rmin<R<Rmax, Gmin<G<Gmax, and Bmin<B<Bmax, the sheet-surface portion distribution-determining section 309 determines that the area of the pixels belongs to the sheet-surface portion.

It should be noted that in the present embodiment, the lower and upper limit values are set such that Rmin=Bmin=Gmin=200, and Rmax=Bmax=Gmax=255 hold. Further, recording media are generally different in lightness (luminance) depending on the material, coloring, etc. thereof. Therefore, it is desirable that in association with a plurality of recording media, a plurality of sets of pairs of upper and lower limit values of the pixel values of the three colors are stored, respectively. Further, there is a case in which the same recording medium is different in the form of coloring and hence different in lightness (luminance), depending on an area thereon. In such a case, it is desirable that a plurality of sets of upper and lower limit pixel values of the three colors are stored for the same recording medium.

Figures 5A, 5B:
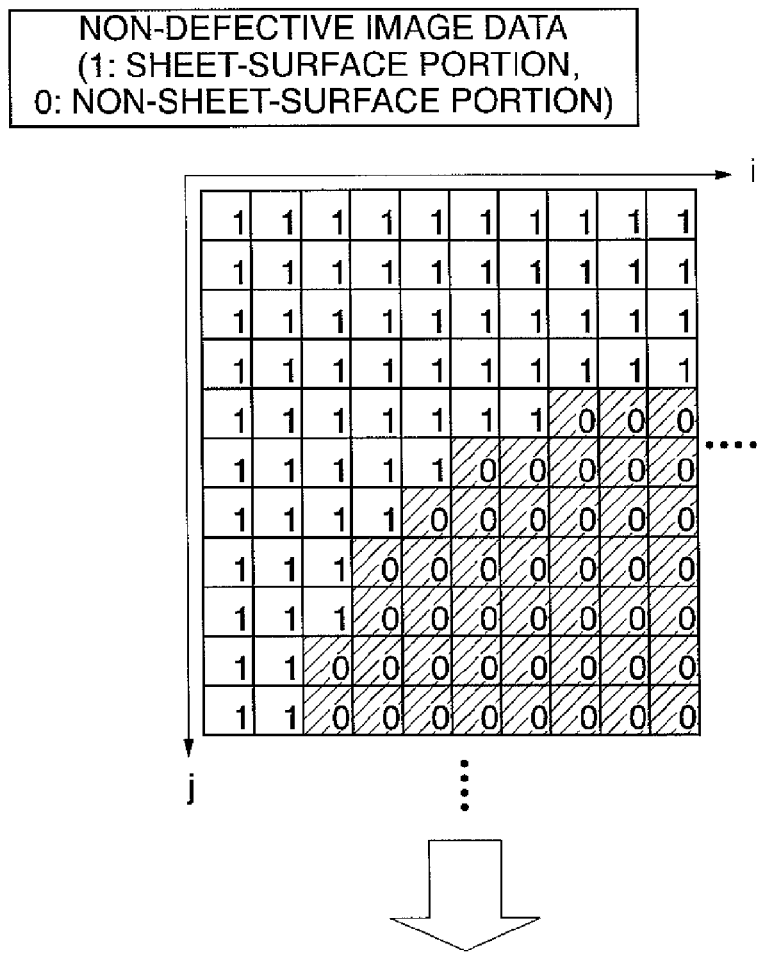
FIGS. 5A and 5B include a conceptual diagram useful in explaining a sheet-surface portion-determining process executed by a sheet-surface portion distribution-determining section of the image processor.

Next, the sheet-surface portion distribution-determining section 309 stores the information on the sheet-surface portion/non-sheet-surface portion distribution in the non-defective formed image on a pixel set-by-pixel set basis based on the result of the determination of sheet-surface portions on a three-color pixel set basis. In this case, as shown in FIGS. 5A and 5B, a value indicative of the determination that a set of three RGB pixels indicated by one address corresponds to a sheet-surface portion is set to 1, and a value indicative of the determination that a set of three RGB pixels indicated by one address corresponds to a non-sheet-surface portion is set to 0. Then, as to the non-defective formed image, information on the sheet-surface portion/non-sheet-surface portion distribution is stored on a pixel set-by-pixel set basis, forming a sequence of 1-bit data.

Figures 6A, 6B:
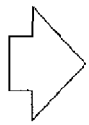
FIGS. 6A and 6B include a conceptual diagram useful in explaining a method of calculation of an offset signal executed by the sheet-surface portion distribution-determining section of the image processor.

Next, as shown in FIGS. 6A and 6B, from the pixel group data of RGB which are determined to correspond to a sheet-surface portion, smallest pixel values (R-min, G-min, and B-min) are obtained from the respective RGB colors. Next, the sheet-surface portion distribution-determining section 309 subtracts 50%-luminance pixel values (R-half, G-half, and B-half) of the RGB colors from the smallest pixel values (R-min, G-min, and B-min) of the respective RGB pixels. Then, the sheet-surface portion distribution-determining section 309 sends the results of subtractions (differences) to the sheet-surface portion determination-based offset section 308 as the offset signals (R-offset, G-offset, and B-offset).

These offset signals are utilized by the sheet-surface portion determination-based offset section 308 as follows: The sheet-surface portion determination-based offset section 308 subtracts the above-mentioned offset signals from the image data associated with the formed image on an inspection object and received from the main MTF corrector 307 (see FIG. 7). This subtraction process is performed on a pixel basis.

In the case of a sheet-surface portion, respective most significant bit values of the image data R', G' and B' (each 8 bits) obtained by the subtraction process are all equal to 1. On the other hand, in the case of a non-sheet-surface portion, at least one of the most significant bit values of the image data R', g' and B' (each 8 bits) obtained by the subtraction process is necessarily equal to 0. This means that it is possible to determine as to the formed image on the inspection object, whether pixels belong to a sheet-surface portion or a non-sheet-surface portion, only from the most significant bits (a total of 3 bits).

The sheet-surface portion determination-based offset section 308 sends the most significant bit values of the subtracted image data R', G', and B' prepared by subtraction of the offset signal to the image quality-determining section 310. The image quality-determining section 310 determines using the most significant bit values whether the formed image on the inspection object is defective or non-defective, and based on the result of the determination, determines whether the inspection object is defective or non-defective.

More specifically, the image quality-determining unit 310 receives the most significant bit value of each of the above-mentioned image data R', G', and B' (total 3 bits), sequentially, on a pixel set-by-pixel set basis, from the sheet-surface portion determination-based offset section 308.

Further, the image quality-determining section 310 receives a determination value (1 bit) indicative of the result of the determination of the sheet-surface portion/non-sheet-surface portion as to the pixels corresponding to the received most significant bit values, from the sheet-surface portion distribution-determining section 309. The reception of the most significant bit values and the determination value are synchronously performed on a pixel set-by-pixel set basis.

Next, the image quality-determining section 310 carries out determination on the quality of the image, on a pixel set-by-pixel set basis, as illustrated in FIG. 8. In FIG. 8, the determination value as to whether a set of RGB pixels belongs to a sheet-surface portion or a non-sheet-surface portion is set such that a determination that they belong to a sheet-surface portion is represented by 1 and a determination that they belong to a non-sheet-surface portion is by 0. The image quality-determining section 310 does not carry out image quality determination as to each set of RGB pixels which are determined to correspond to a non-sheet-surface portion. This makes it possible to avoid useless quality determination processing, which contributes to increased processing speed.

On the other hand, the image quality-determining section 310 carries out the image quality determination as to each set of RGB pixels which are determined to correspond to a sheet-surface portion. In this case, the image quality-determining section 310 determines that the image quality of the pixel is non-defective if all the most significant bit values of the image data R', G', and B' are equal to 1. On the other hand, if any of the most significant bit values of the image data R', G', and B' is equal to 0, the image quality-determining section 310 determines that the image quality of the pixels are defective.

Further, the image quality-determining section 310 is equipped with a counter N, and initializes the count of the counter N to 0 whenever a formed image on an inspection object is read in by the scanner section 101. Then, the image quality-determining section 310 increments the count of the counter N by 1 whenever the image quality of a set of three RGB pixels in a formed image on an inspection object is determined to be defective.

The image quality-determining section 310 determines that the inspection object itself is defective, when the count of the counter N concerning the formed image on the inspection object exceeds a threshold value Nth. On the other hand, as to the formed image on the inspection object, when the count of the counter N is not more than the threshold value Nth, the image quality-determining section 310 determines that the inspection object is non-defective. In the present embodiment, the threshold value Nth is set to a value obtained by multiplying the number (N-image) of pixels of a non-sheet-surface portion by β (0.01). Further, the result of the quality determination is indicated by 1 bit a value of which is set to 1 when an inspection object is defective and to 0 when the same is non-defective.

In the present embodiment, as described above, the inspection object is determined to be defective only when the count of the counter Nth exceeds the threshold value Nth. By appropriately setting the threshold value Nth, it is possible to prevent inspection objects which should be determined to be non-defective from being erroneously determined to be defective.

The image quality-determining section 310 sends the result of the quality determination as to the inspection object to the scanner controller 300. The scanner controller 300 drivingly controls the aforementioned sheet discharge destination-switching flapper 219 such that the destination of an inspection object subjected to the quality determination is switched according to the result of the quality determination.

Figure 9:
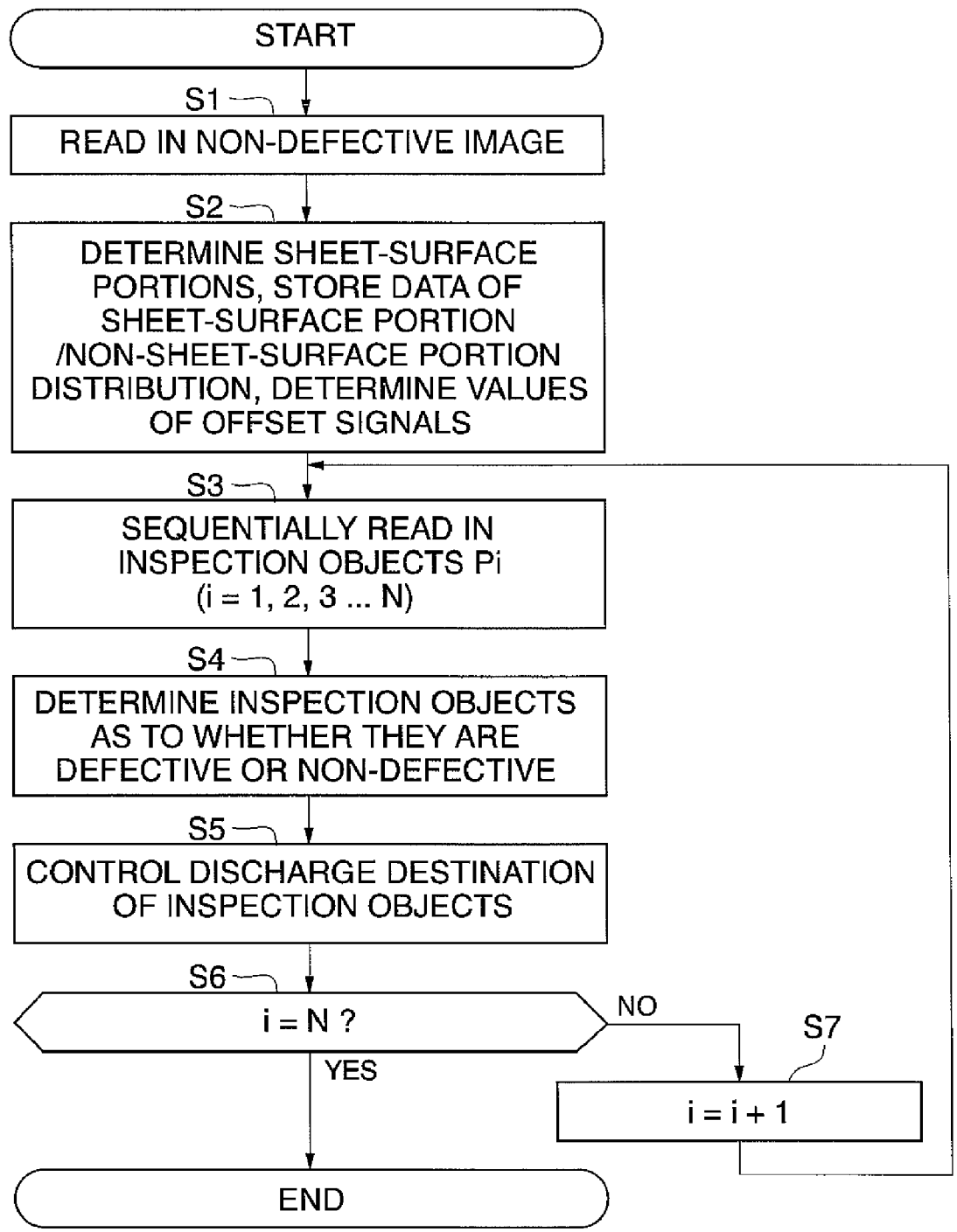
FIG. 9 is a flowchart of an inspection process executed in the first embodiment.
Figure 10:
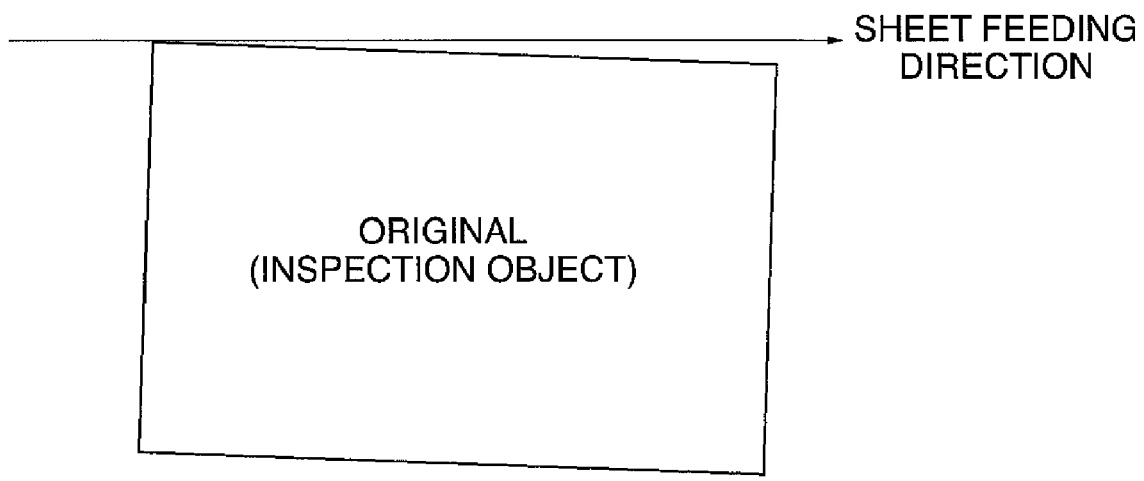
FIG. 10 is a conceptual diagram useful in explaining problems of the first embodiment.

The outline of the above-described inspection process is shown in the flowchart of FIG. 9. More specifically, the flowchart mainly illustrates inspection processing specific to the present embodiment by omitting the general processing, such as various corrections on image data. Further, this inspection process is realized by the scanner controller 300 executing a program storing therein.

The user first sets a selected recording medium and inspection objects on the original stacker 201 of the ADF 110. In this case, the selected recording medium is set as the uppermost layer so as to feed the same in the first place, and the inspection objects are set thereunder in a layered fashion. Then, the user sets the inspection mode, and selects the aforementioned upper and lower limit reference pixel values of each of RGB colors associated with the selected recording medium for determination of the sheet-surface portion. After inputting the number N of sheets of the inspection objects, the user instructs the start of the inspection process. These operations are carried out using an operating section (not shown) of the image forming apparatus.

In response to the instruction of the start, the scanner controller 300 controls the scanner section 101 such that a formed image on the selected recording medium set on the uppermost layer is read in (step S1). It should be noted that the formed image on the selected recording medium is a non-defective image. Therefore, the scanner controller 300 controls the original inversion and discharge section 211 such that after reading the formed image, the selected recording medium is discharged onto the non-defective original discharge section 212.

Next, the sheet-surface portion distribution-determining section 309 determines sheet-surface portions of the non-defective formed image on a pixel set-by-pixel set basis, based on the image data of the non-defective formed image thus read in, under the control of the scanner controller 300 (step S2). Then, the sheet-surface portion distribution-determining section 309 under the control of the scanner controller 300 stores data of a sheet-surface portion/non-sheet-surface portion distribution of the formed image on a pixel set-by-pixel set basis (step S2).

Further, the sheet-surface portion distribution-determining section 309 under the control of the scanner controller 300 determines a value of the aforementioned offset signal based on the smallest value of the pixel value of each of RGB colors of the pixel data group determined to correspond to a sheet-surface portion, and sends the value to the sheet-surface portion determination-based offset section 308 (step S2). It should be noted that the value of the offset signal is fixed until the inspection of all of the inspection objects set on the ADF 110 is completed.

Next, the scanner controller 300 controls the scanner section 101 such that the formed images on the set inspection objects are sequentially read in, starting from the uppermost layer (step S3). When reading the first one of the inspection objects, the scanner controller 300 set a variable i to 1.

Next, the scanner controller 300 properly controls the sheet-surface portion determination-based offset section 308, the sheet-surface portion distribution-determining section 309, and the image quality-determining section 310, to thereby cause the inspection objects to be determined as to whether they are defective or non-defective in the above-mentioned manner (step S4). Then, the scanner controller 300 controls the discharge destination of the inspection object according to the result of the quality determination thereof.

Next, the scanner controller 300 determines whether or not the variable i has reached a number N of the set inspection objects (step S6). As a result, if it is determined that the variable i has not reached the number N of the inspection objects, the scanner controller 300 increments the variable i by 1 (step S7), and the process returns to the step S3. This return enables all of the set inspection objects to be subjected to the same inspection process.

As described above, in the first embodiment, the offset signals are generated by making use of image data of pixel groups of a non-defective formed image which are determined to correspond to sheet-surface portion potions of the image. Then, correction of image data of each image formed based on the same original image is performed using the offset signals. Further, whether the formed image is defective or non-defective is determined by making use of the value of the most significant one bit of each pixel of the corrected image data.

Therefore, it is possible to detect whether a formed image is defective or non-defective, further, whether a recording medium (inspection object) on which the formed image is recorded is defective or non-defective, as accurately as possible and at high speed. Further, it is possible to reduce the size of a circuit for realizing such a function.

In particular, by performing determination whether or not a formed image is defective or non-defective or inspection of a recording medium including the formed image, using one bit of each of RGB colors generated by using the associated offset signal, it is possible to achieve the same accuracy of determination and inspection as that performed using the full bits of each of the RGB colors. Further, by varying the values of respective offset signals according to the kind of recording medium, it is possible to perform the above-mentioned determination and inspection, in a manner adapted to the kind of recording medium.

When originals (selected recording medium and inspection objects) are continuously read in by the ADF 110, there can occur a case where an original is displaced from the normal reading position. In such a case, there is a fear that the displacement causes degradation of the accuracy of determination of the quality of a formed image executed on a pixel-by-pixel basis or inspection of an original (inspection object) including the formed image.

Figure 11:
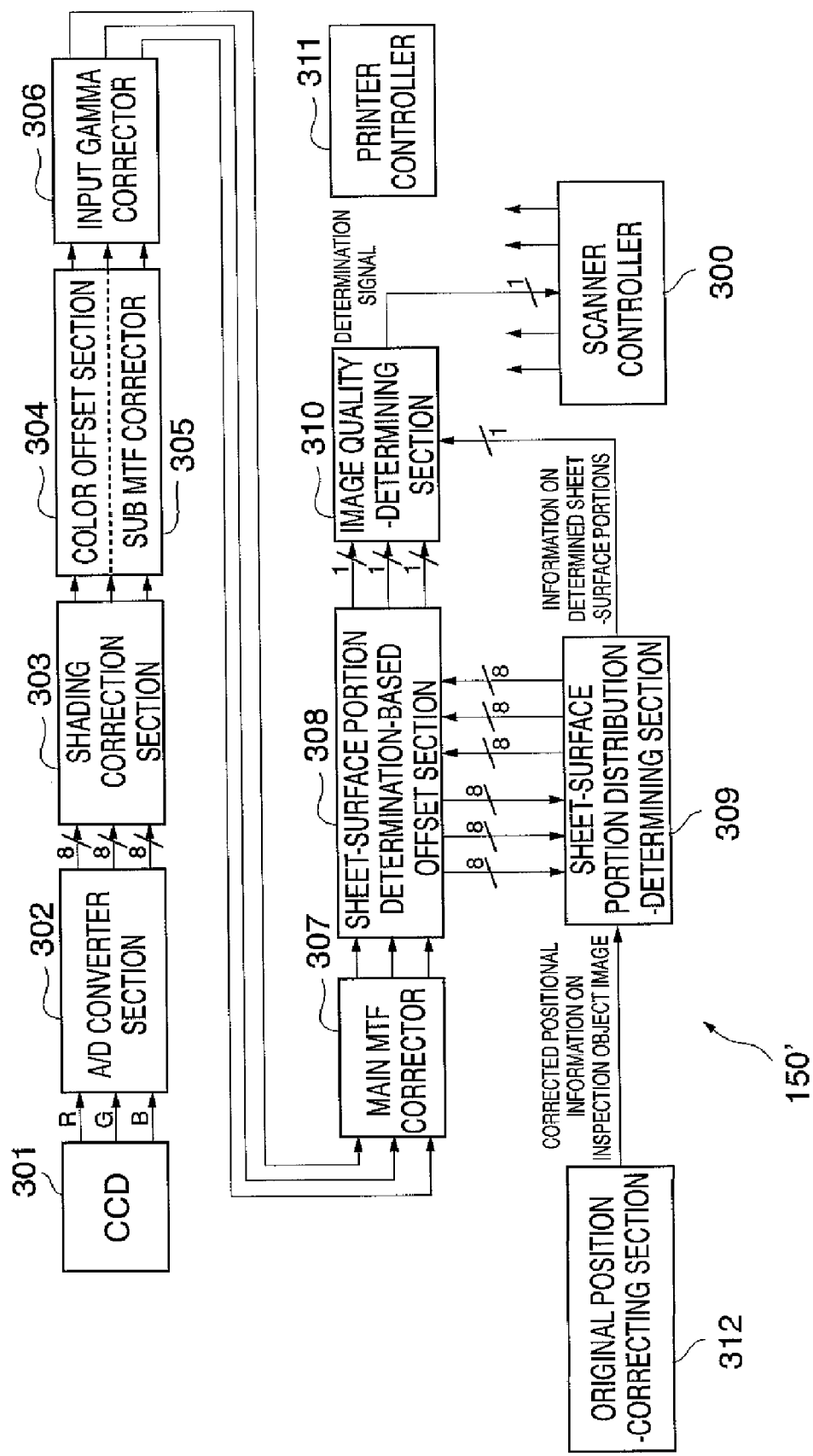
FIG. 11 is a block diagram of a variation of the image processor in which problems in the first embodiment in FIG. 10 are solved.

To solve the problem, as shown in FIG. 11, an original position-correcting section 312 may be provided on an image processor 150', whereby positional correction (address conversion) of the image data read from the original image may be performed according to the displacement of the image reading position.

More specifically, the image position-correcting section 312 detects a skew of an original by a method disclosed in Japanese Laid-Open Patent Publication (Kokai) No. S56-105579, and corrects the positional information according to the detected skew. Next, the original position-correcting section 312 sends the corrected positional information to the sheet-surface portion distribution-determining section 309. The sheet-surface portion distribution-determining section 309 extracts 1-bit information at each address corresponding to the corrected positional information, from the data of the sheet-surface portion/non-sheet-surface portion distribution of the non-defective image stored therein. Then, the sheet-surface portion distribution-determining section 309 sends the 1-bit information on the sheet-surface portion/non-sheet-surface portion at the address corresponding to the corrected positional information to the image quality-determining section 310.

This makes it possible to perform appropriate image quality determination and inspection in a manner coping with the displacement of the position of an original from the proper reading position.

In the first embodiment, the sheet-surface portion determination-based offset section 309 receives the offset signals from the sheet-surface portion distribution-determining section 309, and subtracts the offset signals from respective associated image data (RGB) of a formed image on an inspection object supplied from the main MTF corrector 307. Then, the sheet-surface portion determination-based offset section 308 sends the most significant bits of the image data of RGB colors subjected to the subtraction process to the image quality-determining section 310.

Figure 12:
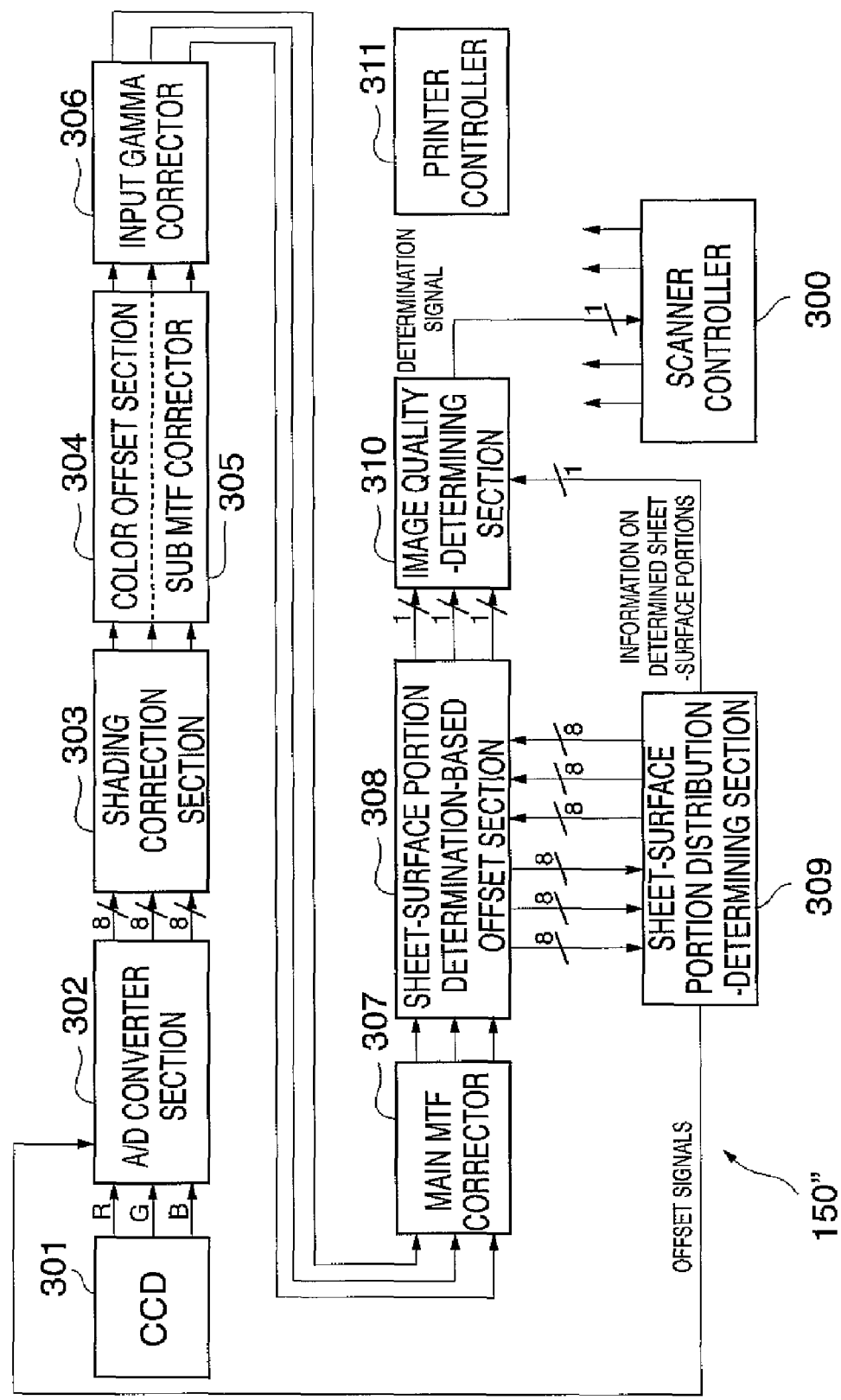
FIG. 12 is a block diagram of an image processor of a scanner section of an image forming apparatus according to a second embodiment of the present invention.

As distinct from the first embodiment, an image processor 150" of the scanner section 101 of an image forming apparatus according to a second embodiment of the present invention is configured such that a process corresponding to the above-described offset signal-subtracting process is executed by an A/D conversion section 302 shown in FIG. 12, with a view to execution of the image quality determination and the inspection at a higher speed than in the first embodiment. Since the other component elements are the same as those of the first embodiment, they are indicated by the same reference numerals, and description thereof is omitted.

FIG. 12 is a block diagram of the image processor 150" of the scanner section 101 of the image forming apparatus according to the second embodiment. The image processor 150" shown in FIG. 12 is somewhat different from the image processor 150 shown in FIG. 3 in processing executed by the A/D conversion section 302, the sheet-surface portion determination-based offset section 308, the sheet-surface portion distribution-determining section 309. The other blocks other than these perform the same processing as in the first embodiment, and hence description of these blocks executing the same processing is omitted.

In FIG. 12, the sheet-surface portion determination-based offset section 308 sends image data (8 bits for each of RGB pixels) of a formed image on a selected recording medium supplied from the main MTF correcting section 307 to the sheet-surface portion distribution-determining section 309. Further, the sheet-surface portion determination-based offset section 308 sends the most significant bit values (one bit for each of the RGB pixels, and a total of three bits) of image data of a formed image on an inspection object supplied from the main MTF corrector 307, to the image quality-determining section 310.

That is, in the first embodiment, the sheet-surface portion determination-based offset section 308 receives the offset signals from the sheet-surface portion distribution-determining section 309. Then, the sheet-surface portion determination-based offset section 308 subtracts the offset signals from the image data (RGB) of the inspection object supplied from the main MTF corrector 307. Further, the sheet-surface portion determination-based offset section 308 sends the most significant bit values of the image data subjected to the subtraction process to the image quality-determining section 310.

In contrast, in the second embodiment, the sheet-surface portion determination-based offset section 308 does not perform the subtraction of the offset signal. That is, the sheet-surface portion determination-based offset section 308 sends the value of the most significant bit of each pixel of the image data (RGB) of the inspection object from the main MTF correcting section 307, to the image quality-determining section 310 as it is.

In FIG. 12, the sheet-surface portion determination section 309 receives image data of the formed image on the selected recording medium from the main MTF corrector 307 via the sheet-surface portion determination-based offset section 308, and based on the image data, determines sheet-surface portions of the formed image on the selected recording medium. Then, the sheet-surface portion distribution-determining section 309 recognizes the sheet-surface portion/non-sheet-surface portion distribution based on the result of the sheet-surface portion determination, and stores data of the sheet-surface portion/non-sheet-surface portion distribution. This processing is the same as executed in the first embodiment.

In the second embodiment, the sheet-surface portion distribution-determining section 309 calculates the offset signals in the same manner as in the first embodiment. Then, while in the first embodiment, the sheet-surface portion distribution-determining section 309 sends the offset signals to the sheet-surface portion determination-based offset section 308, in the second embodiment, the sheet-surface portion distribution-determining section 309 sends the offset signal to the A/D conversion section 302.

The A/D conversion section 302 in the second embodiment performs gain adjustment and offset adjustment on analog video signals (RGB) from the CCD 301 on a selected recording medium and inspection objects, in the same manner as in the first embodiment.

The A/D conversion section 302 in the second embodiment further performs a second offset adjustment on the analog video signals (RGB) concerning the inspection object, from the CCD 301, using the offset signals from the sheet-surface portion distribution-determining section 309. It should be noted that the calculation of the offset signals is performed only once after the sheet-surface portion/non-sheet-surface portion distribution data is prepared on the image data of the image on the selected recording medium, and the sending of the offset signals to the A/D conversion section 302 is also performed only once for all the set inspection objects, so that the second offset adjustment is performed on all the inspection objects using the same offset signals.

Next, the A/D conversion section 302 of the image processor 150" converts the analog video signals (RGB) concerning the selected recording medium, which have been subjected to the gain adjustment and offset adjustment, into 8-bit digital image data. Further, the A/D conversion section 302 converts the analog video signals (RGB) of the inspection object subjected to the gain adjustment, the offset adjustment, and the second offset adjustment, into 8-bit digital image data.

At this time point, the image data on the inspection object delivered from the A/D conversion section 302 in the second embodiment are already made equivalent by the second offset adjustment to the image data from which the offset signals are subtracted by the sheet-surface portion determination-based offset section 308 in the first embodiment. That is, the values of the image data of the inspection object delivered from the A/D conversion section 302 in the second embodiment are values formed by subtracting the offset signals from the image data as illustrated by the image data R', G' and B' in FIG. 7.

Therefore, the sheet-surface portion determination-based offset section 308 according to the second embodiment is only required to send the value of the most significant bit of each pixel to the image quality-determining section 310 as it is without performing subtraction of the offset signals from the image data of the inspection object.

With this configuration, the number of operations executed within the digital circuit is made smaller than in the first embodiment, which makes it possible to perform the image quality determination and the inspection on the inspection object at a higher speed. Further, the size of the image processor 150" can be made smaller.

It should be noted that the present invention is not limited to the first embodiment, the variation thereof, or the second embodiment, but can be subjected to various modifications and alterations. For example, the functions specific to the first embodiment, the variation thereof, and the second embodiment can be applied not only to the image forming apparatus in which the scanner section and the printer engine section are integrally arranged, but also to a scanner apparatus (dedicated unit) having a scanner function as its main function.

Further, when the state of lightness (luminance) is similar between an original, a selected recording medium on which an image of the original is normally formed, and inspection objects on which the same image is formed, it is not required to newly read in the formed image on the selected recording medium before performing the inspection process. In this case, it is possible to appropriately perform the image quality determination of each formed image and inspection of each inspection object, also by storing the image data formed by reading the original, and performing the above-described determination of sheet-surface portions, based on the stored data.

Further, the functions specific to the first embodiment, the variation thereof, and the second embodiment of the present invention can be installed not only on the full-color image forming apparatus and the full-color scanner apparatus, but also on a monochrome image forming apparatus, a monochrome scanner apparatus, etc.

It is to be understood that the present invention may also be realized by supplying a system or an apparatus with a storage medium in which a program code of software, which realizes the functions of the above described embodiment is stored, and causing a computer (or CPU or MPU) of the system or apparatus to read out and execute the program code stored in the storage medium.

In this case, the program code itself read from the storage medium realizes the functions of the above described embodiment, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of the above described embodiment may be accomplished not only by executing the program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to an exemplary embodiment, it is to be understood that the invention is not limited to the disclosed exemplary embodiment. The scope of the following claims is to be accorded the broadest interpretation so as to encompass all modifications, equivalent structures and functions.

This application claims priority from Japanese Patent Application No. 2006-333750 filed Dec. 11, 2006, which is hereby incorporated by reference herein in its entirety.

What is claimed is:

1. An image processor that determines whether images formed on a plurality of recording media based on an image on an original are defective or non-defective, comprising:
   a first determination unit configured to determine an area of a sheet-surface portion in a first image formed on a predetermined recording medium, based on the image of the original;
   a correction unit configured to perform correction on image data of a second image formed on another recording medium based on the image of the original, by making use of image data of a group of pixels which are determined to correspond to the area of the sheet-surface portion, by said first determination unit; and
   a second determination unit configured to determine whether or not the second image is defective or non-defective by making use of a value of a predetermined one bit of image data of the second image corrected by said correction unit.

2. An image processor as claimed in claim 1, wherein said first determination unit includes a calculation unit configured to calculate an offset value by making use of a smallest pixel value of image data of the group of pixels which are determined to correspond to the area of the sheet-surface portion.

3. An image processor as claimed in claim 2, wherein said calculation unit calculates the offset value by subtracting a predetermined luminance value from the smallest pixel value.

4. An image processor as claimed in claim 3, wherein said correction unit includes a subtraction unit configured to subtract the offset value from each pixel value of the image data of the second image.

5. An image processor as claimed in claim 4, wherein said second determination unit determines whether the second image is defective or non-defective, using a value of the most significant bit of image data in the area of the sheet-surface portion out of the image data of the second image as a result of the subtraction by said subtraction unit.

6. An image processor as claimed in claim 4, wherein the first image and the second image are color images, and said first determination unit, said correction unit, said second correction unit, said calculation unit, and said subtraction unit perform processing on three primary-color components of the image data which form a color image.

7. An image processor as claimed in claim 1, comprising a discharge destination-switching unit configured to switch a destination of the recording medium having the second image formed thereon according to the result of the determination of the second image by said second determination unit as to whether the second image is defective or non-defective.

8. A method of controlling an image processor that determines whether images formed on a plurality of recording media based on an image on an original are defective or non-defective, comprising:
   a first determination step of determining an area of a sheet-surface portion in a first image formed on a predetermined recording medium, based on the image of the original;
   a correction step of performing correction on image data of a second image formed on another recording medium based on the image of the original, by making use of image data of a group of pixels which are determined to correspond to the area of the sheet-surface portion, in said first determination step; and
   a second determination step of determining whether or not the second image is defective or non-defective by making use of a value of a predetermined one bit of image data of the second image corrected in said correction step.

9. An image forming apparatus in which an image processor that determines whether images formed on a plurality of recording media based on an image on an original are defective or non-defective,
   wherein the image processor comprises:
   a first determination unit configured to determine an area of a sheet-surface portion in a first image formed on a predetermined recording medium, based on the image of the original;
   a correction unit configured to perform correction on image data of a second image formed on another recording medium based on the image of the original, by making use of image data of a group of pixels which are determined to correspond to the area of the sheet-surface portion, by said first determination unit; and
   a second determination unit configured to determine whether or not the second image is defective or non-defective by making use of a value of a predetermined one bit of image data of the second image corrected by said correction unit.

10. A non-transitory computer-readable storage medium storing a control program for causing a computer to execute a method of controlling an image processor that determines whether images formed on a plurality of recording media based on an image on an original are defective or non-defective, wherein the control program comprises:

a first determination module for determining an area of a sheet-surface portion in a first image formed on a predetermined recording medium, based on the image of the original;

a correction unit module for performing correction on image data of a second image formed on another recording medium based on the image of the original, by making use of image data of a group of pixels which are determined to correspond to the area of the sheet-surface portion, by said first determination module; and a second determination module for determining whether or not the second image is defective or non-defective by making use of a value of a predetermined one bit of image data of the second image corrected by said correction module.

* * * * *